(12) United States Patent
O'Connor

(10) Patent No.: US 7,665,697 B1
(45) Date of Patent: Feb. 23, 2010

(54) IN SCISSOR TYPE CLAMP

(76) Inventor: Michael T. O'Connor, 750 S. Mallard Dr., Schaumburg, IL (US) 60067

( * ) Notice: Subject to any disclaimer, the term of this patent is extended or adjusted under 35 U.S.C. 154(b) by 0 days.

(21) Appl. No.: 11/759,334

(22) Filed: Jun. 7, 2007

(51) Int. Cl.
*F16M 11/02* (2006.01)
*A47F 5/00* (2006.01)

(52) U.S. Cl. ............ 248/181.1; 248/276.1; 248/288.31; 248/484

(58) Field of Classification Search ............ 248/288.31, 248/288.51, 274.1, 276.1, 181.1, 181.2, 484, 248/226.11, 231.51; 403/56, 122, 133, 110, 403/113, 114, 116, 117
See application file for complete search history.

(56) References Cited

U.S. PATENT DOCUMENTS

| 4,461,284 | A | * | 7/1984 | Fackler | 600/228 |
| 5,419,522 | A | * | 5/1995 | Luecke et al. | 248/288.51 |
| 5,845,885 | A | | 12/1998 | Carnevali | |
| 7,090,181 | B2 | * | 8/2006 | Biba et al. | 248/288.31 |
| 7,178,421 | B2 | * | 2/2007 | Filipiak et al. | 74/490.05 |
| 2002/0166935 | A1 | * | 11/2002 | Carnevali | 248/276.1 |
| 2006/0000957 | A1 | * | 1/2006 | Carnevali | 248/181.1 |

\* cited by examiner

*Primary Examiner*—Amy J Sterling
*Assistant Examiner*—Tan Le
(74) *Attorney, Agent, or Firm*—Patnaude and Videbeck

(57) ABSTRACT

An improved scissor-type clamp includes two opposing clam shell type members, one male and one female, that pivot together, are biased outwardly by coil springs and are held together by a thumbscrew. Embodiments feature rectangular and tapered opposed clam shell portions and one embodiment includes identical clam shell members.

3 Claims, 6 Drawing Sheets

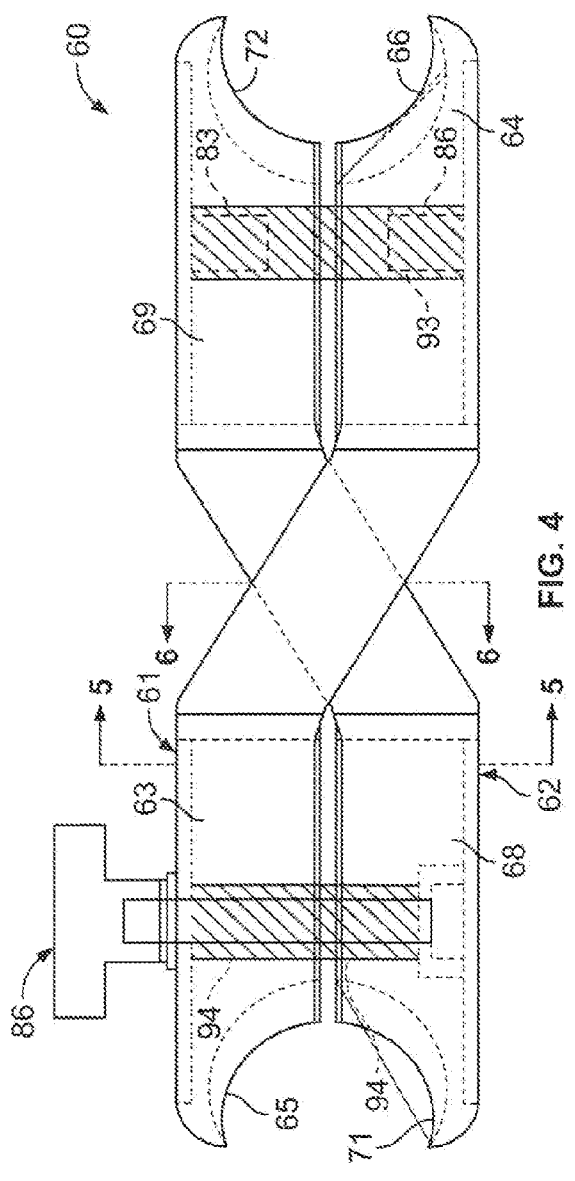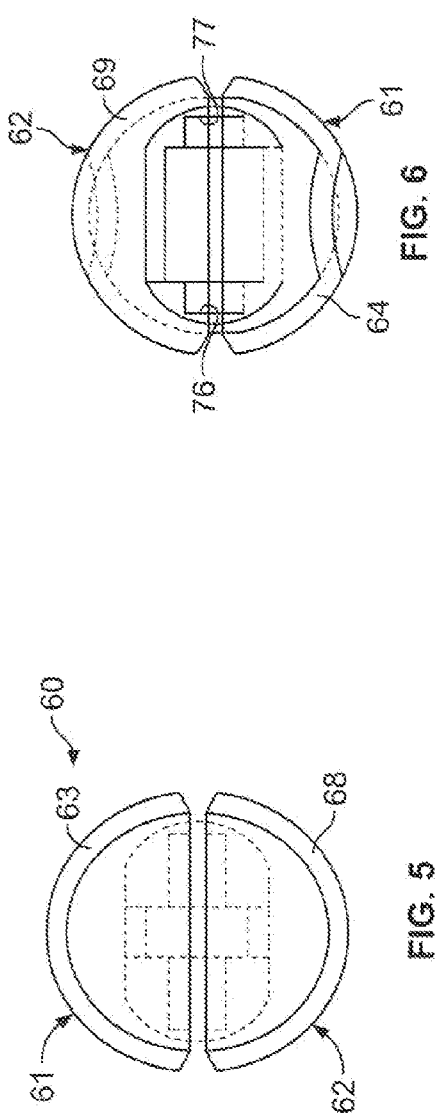

IN SCISSOR TYPE CLAMP

This invention relates to a clamp with opposed ball receiving ends for clamping a movable object in changeable fixed relation to a fixed base and, more particularly, to a scissor type clamp having opposed ball receiving ends.

BACKGROUND OF THE INVENTION

Adjustable mountings for cathode ray tubes (CRT), light emitting diode (LED), and/or plasma screens and other monitors are quite popular as desktop computers have become tower designs built to be positioned out of sight under a worker's desk. The mounting may be fixedly positioned at one end on a desk, on a wood or metal stand positionable on the desk, or on a wall or other structure.

One such clamp presently utilized to adjustably mount a pair of ball mounting ends thereto is found at U.S. Pat. No. 5,845,885 issued to Carnavalli Dec. 8, 1998. The clamp disclosed in Carnavalli has opposed double clam shell type ends held together by both being pivotally mounted to a central bolt having a handle screw threaded onto one end thereof. With each of the centrally facing clamp halves, freely rotatable about the bolt axis and also axially movable depending upon the tightness of the handle on the bolt, the clamp tends to be somewhat unstable until the handle is fully tightened on the bolt clamping each of the clamp halves onto its respective ball mounting.

A need has developed for an improved double ended ball holding clamp having improved stability in its unclamped mode.

SUMMARY OF THE INVENTION

It is therefore an object of the present invention, generally stated, to provide a new and improved double opposed adjustable ball mounting clamp for use, among other mountings, for adjustably positioning a cathode ray tube or light emitting diode screen thereon.

Another object of the present invention is the provision of an improved double opposed ended ball mounting clamp having a scissor clamping feature.

The invention resides in a scissors type clamp with opposed ball receiving heads. The clamp comprises a pair of elongate complementary split arm members with each including hollow semi-ball shape ends facing a common plane. Each split arm member includes a pivotal mounting positioned substantially centrally between each of the semi-ball shape ends. The pivotal mounting on one of the pair of split arm members is complementary to a pivotal mounting on the other of the split arm members. The clamp further includes adjustable fastener means retained on each of the pair of complementary split arm members offset to a common side of the pivotal mounting for selectively adjusting the distance between complementary ends adjacent one another.

The invention further resides in a scissor clamp comprising a pair of substantially identical clamp members. Each such member includes opposed end portions with each such portion having a recess for providing about half an operative clamp with each such recess facing a common plane from opposing sides thereof and a central portion connecting the opposing portions and crossing the common plane. The central portion is offset to one side of the opposed end portions and includes pivot means through the central portion substantially on the common plane for providing operative pivotal mounting together of the pair of substantially identical clamp members.

BRIEF DESCRIPTION OF THE DRAWINGS

The features of the present invention which are believed to be novel are set forth with particularity in the appended claims. The invention may best be understood from the following detailed description of currently preferred embodiments thereof taken in conjunction with the accompanying drawings, wherein like numerals refer to like parts, and in which:

FIG. 4 is a vertical cross sectional view of a second embodiment of the scissor clamp;

FIG. 5 is a cross sectional view taken substantially along line 5-5 of FIG. 4a FIG. 6 is a cross sectional view taken substantially along line 6-6 of FIG. 4a;

DETAILED DESCRIPTION OF THE PREFERRED EMBODIMENTS

Figure 1:
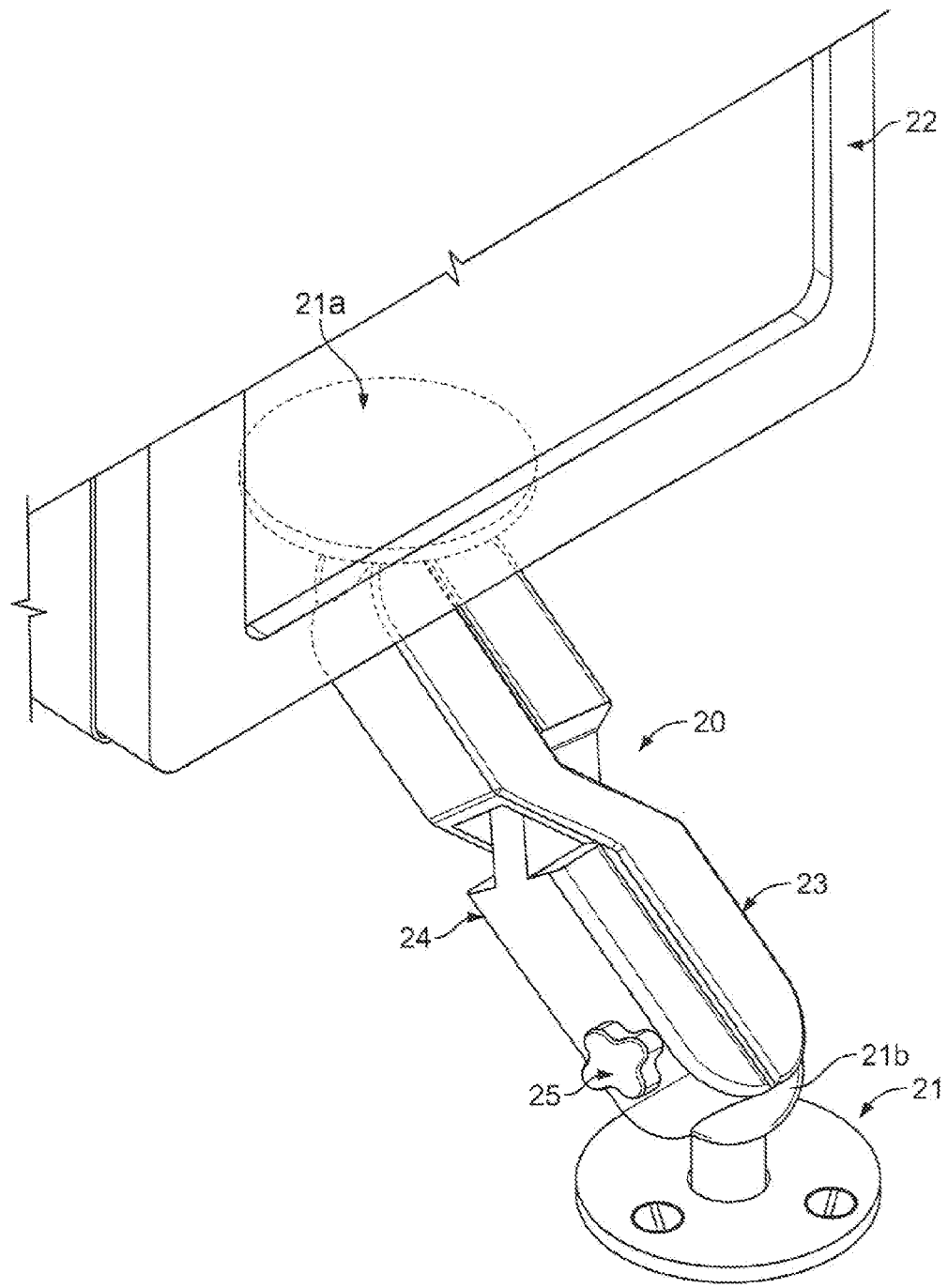
FIG. 1 is a perspective view of a first embodiment of a scissor clamp, constructed in accordance with the present invention, for clamping a pair of ball shape mountings.

Referring to FIG. 1, a first embodiment of a scissor type clamp, generally indicated at 20, constructed in accordance with the present invention as shown most clearly in FIG. 1, receives a first ball-type socket mounting 21, generally indicated at 21 at the bottom thereof, which is preferably mounted on a flat surface, such as a desk, wall, etc. (not shown) and a substantially identical second ball type socket mounting, generally shown in dotted line at 21A, which is mounted as shown in FIG. 1, on the bottom of a CRT monitor, generally indicated at 22. It should be noted that any item can be attached to the ball mounting 21A retained by the clamp 20 of the invention. LCD, plasma and other flat panel displays may commonly be adjustably positioned by the scissors type clamp of the invention.

The clamp 20 of the invention includes a pair of scissor-like members, generally indicated at 23 and 24. The only other externally viewable part of the scissor clamp of the invention 20 is a thumb screw 25 that holds the members together adjacent one end of the scissor clamp 20. The scissor clamp of the invention is preferably made of die cast metal, but can be made of molded plastic, ceramic material, or the like as long as the material is of sufficient strength to support an intended load.

Figure 2:
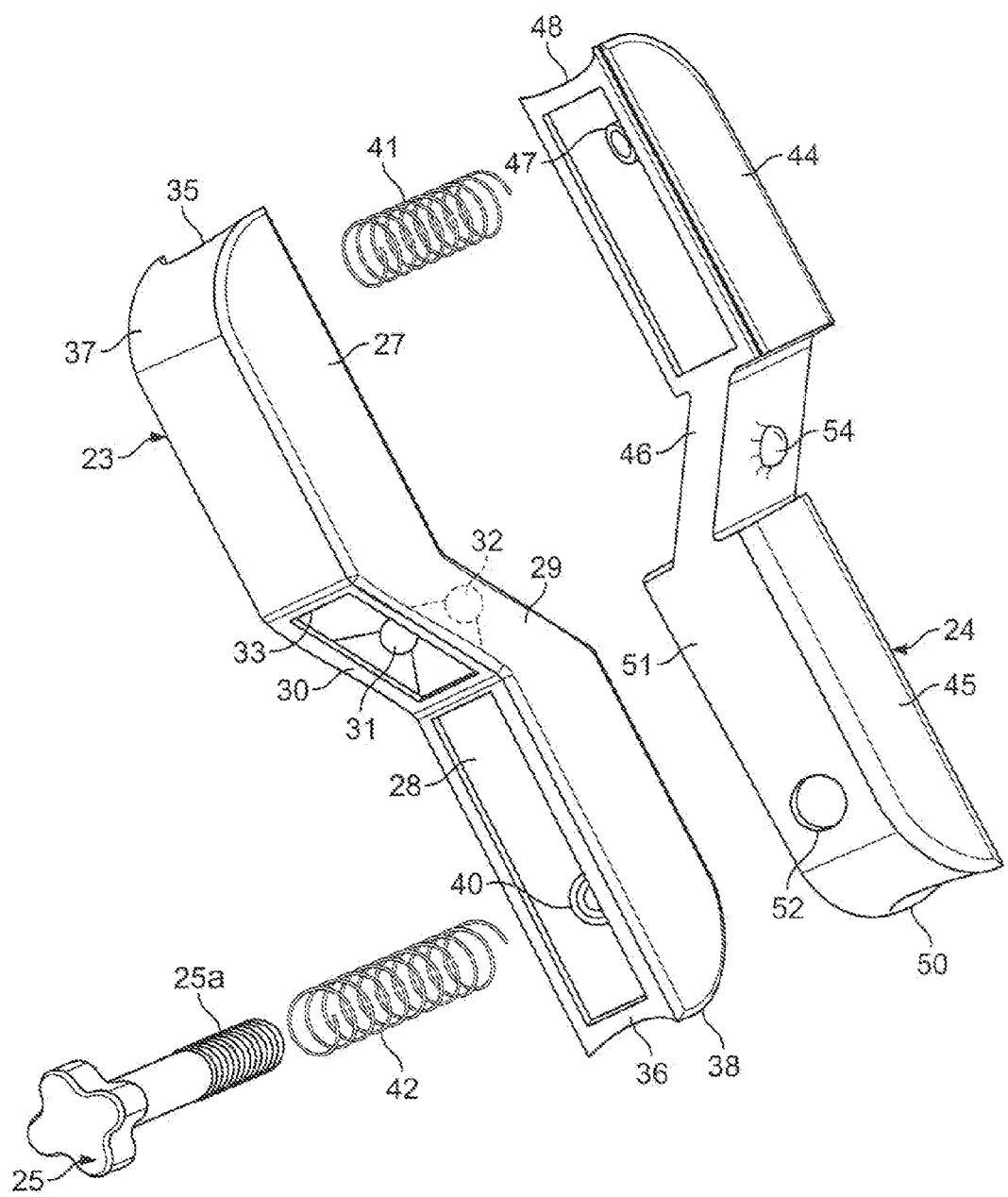
FIG. 2 is an exploded perspective view of the first embodiment of the scissor clamp of the present invention.
Figure 3:
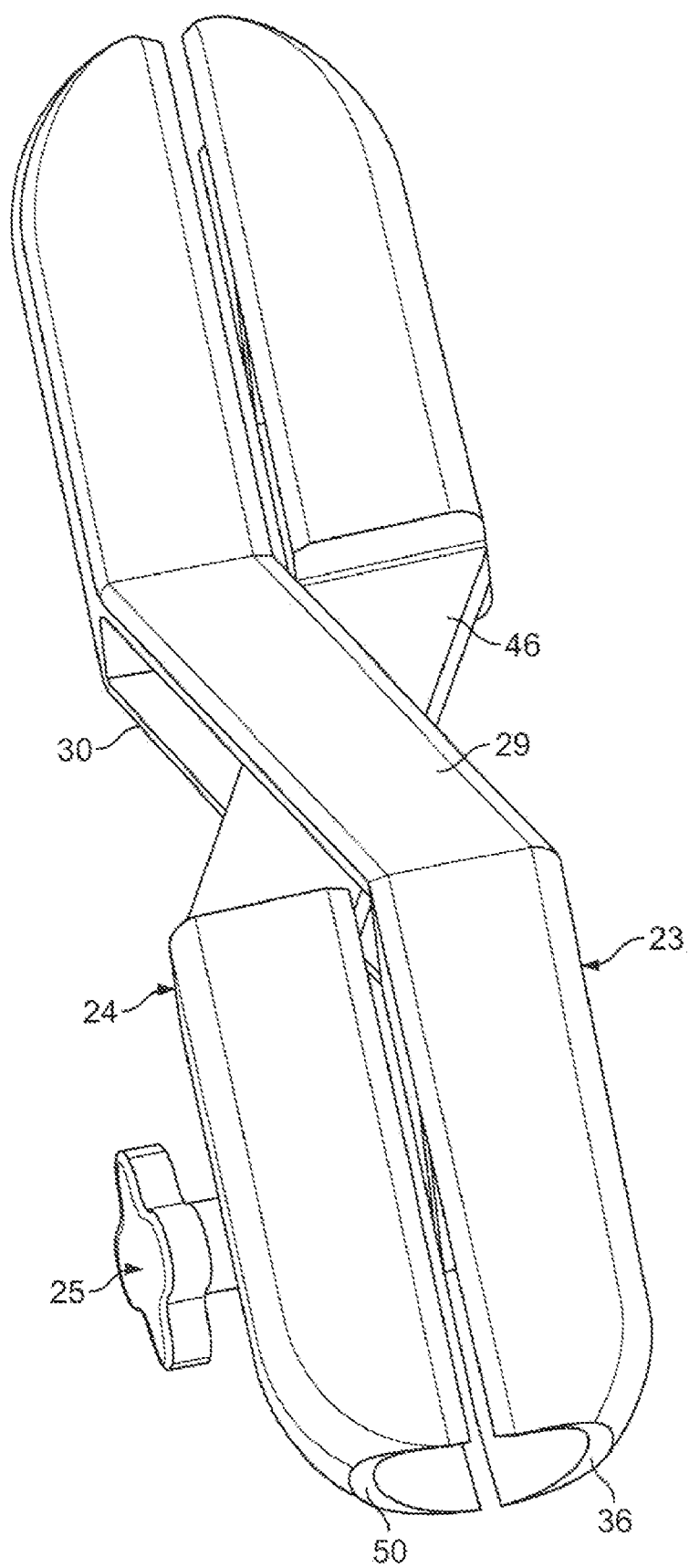
FIG. 3 is a detail perspective view of the first embodiment of the scissor clamp members shown in FIG. 1.

Referring to FIGS. 2 and 3, female scissor part 23 includes opposing end sections 27 and 28 with a pair of spaced apart offset web sections 29, 30 connecting the opposed end sections. The central offset walls 29 and 30 each include a female trunion receiving mounting 31 (only one shown in FIG. 2) 32 shown in dotted line. Each of the opposed ends 27 and 28 of the female scissor member 23 are hollow with open areas facing a common plane running through the trunion receiving mountings 31, 32.

Adjacent each of the opposed ends 27, 28 of scissor member 23 are positioned semicircular recesses 35, 36 that form a boundary of the generally curved end walls 37, 38, respectively. Each of these recesses forms one half of the means for retaining the scissor clamp on the ball type mountings 21, 21A. A hollow cylindrical annular wall 40 is mounted in the interior of end section 27 extends to the interior of the clamp, and is internally threaded to receive the threaded end of thumb screw 25. A similar cylindrical post (not shown) is mounted on the inner wall of end section 27 extends internally similarly to the hollow cylindrical wall 40 to receive one end of a spiral spring 41. Cylindrical wall 40 not only receives the threaded end 25A of thumb screw 25, but also receives and retains a spiral spring 42 around the outside thereof.

A complementary second scissor member, generally indicated at 24, also includes a pair of opposing hollow end sections 44, 45. In this member they are joined together by an offset single central web 46 in the hollow interior thereof. End section 44 also includes a generally cylindrical post 47 which is adapted to receive and retain around the outside thereof one end of the spiral spring 41. Outwardly adjacent the post 47 is a semicircular recess 48 that is complementary to recess 35 on end section 27 of first scissor member 23. At the opposite end of second scissor member 24, and the distal portion of end section 25, is a fourth semicircular recess 50 that is complementary to recess 36 on end section 28 on first scissor member 23. Inwardly there adjacent on the outer wall 51 of end section 24 is a circular aperture 52. The threaded end 25A of thumbscrew 25 extends through aperture 52. The one end of spiral spring 42 is retained by the inside surface of the backside 51 around aperture 52.

The central offset portion 46 or web between the end sections 44 and 45 of second scissor member 24 has positioned centrally on the opposite sides thereof, a pair of trunion mountings (only one shown) 54 which mount respectively in the female trunion receiving portions 31, 32, of the first scissor member 23. To provide a pivot point for the scissor members to interact.

In operation the assembly is put together by rotating one of the opposed ends of second scissor member 24 ninety degrees and moving one of the ends 44 or 45 through the central aperture 33 defined between the opposed offset halves 29, 30. After the end is moved therethrough, the second scissor member is again rotated in a reverse direction to that previously to enable the trunion mountings 54 to slide into the trunion mounting receiving recesses 31, 32 in the central offset portion of the first scissor member 23.

With the scissor members pivotally mounted together, the spiral springs 41 and 42 may be compressed and mounted on the posts 40, 47 and the thumb screw 25 may be inserted through the aperture 52 and threaded onto the interior of hollow post 40 to close the scissor clamp or allow it to be opened.

Referring to FIG. 3, the first and second scissor members 23, 24 are shown in their assembled positioned with the semicircular recesses 50 and 36 for capturing and retaining the ball-type mountings 21, 21a are shown in more detail.

Referring to FIGS. 4-10, a second embodiment of the preferred invention is shown generally at 60. This second embodiment 60 is constructed similarly to the first embodiment 20 with the exception that the outer surfaces of the opposed ends are clam shell shaped and the center offset portions form a more narrow waist that that shown in the first embodiment 20.

The clam shell type scissor clamp 60 of the second embodiment includes first scissor member 61, and second opposing scissor member, generally indicated at 62. As shown most clearly in FIGS. 5 and 6, the outer surface of the first and second scissor member opposed ends are more rounded or semicylindrical in shape than the outer surfaces of the opposed ends of first embodiment 20. First scissor member 61, similarly to first scissor member 23, includes opposed end portions 63 and 64, previously mentioned, that have semicircular wall with each including a semicylindrical shape recess 65, 66, respectively.

Likewise, the opposed ends of second scissor member 62 include semispherical recesses 71 and 72. As with the first embodiment 20, the semicylindrical outer walls 63, 64 of first scissor member 61 and the semicylindrical outer walls 68, 69 of scissor member 61 both are hollow, with a narrowed waist section between the outer walls on each respective member.

Figure 7:
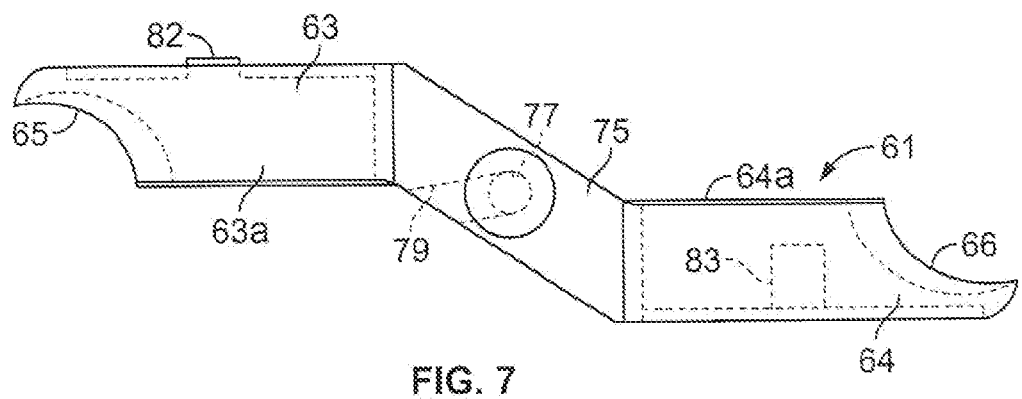
FIG. 7 is a front elevational view of a female clamping member of the second embodiment.

With first scissor member 61 the narrowed waist portion is composed of a pair of opposed spaced apart web members 74, 75 (FIG. 8) which are canted or offset as shown most clearly in FIG. 7 such that the inner edge 63a of clam shell 63 and the inner edge 64a of clam shell 64 are parallel and lie on either side of a center line of the offset portion 75. Centrally of each of the offset portions is a trunion mounting 76, 77 and an elongate recess 78, 79 that allows a pivot member, to be discussed in more detail below, to be mounted between those trunion mountings 76, 77, respectively. The opposed offset central webs 74, 75 together with the bases 63b, 64b provide a very rigid central framework for the first scissor member 61 of the second embodiment. Additionally, first scissor member 61 of the second embodiment includes an aperture 73 through the semicircular wall 64.

Figure 8:
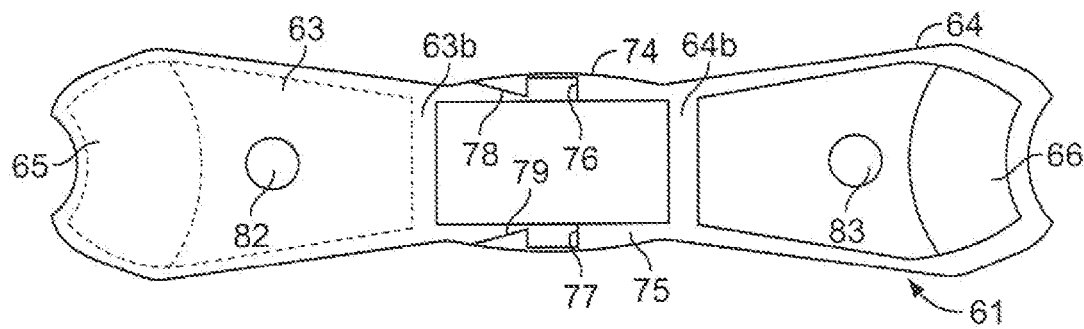
FIG. 8 is a top plan view of the female clamping member shown in FIG. 7.

Referring to FIGS. 7 and 8, on the left side of the first scissor member 61 at the center of the outer wall is an aperture 82 that extends through the wall 63 to the interior thereof. On the right side of the inner surface of the outer wall 64 is a post 83 that extends into the hollow interior of the clam shell shaped outer wall.

Figure 9:
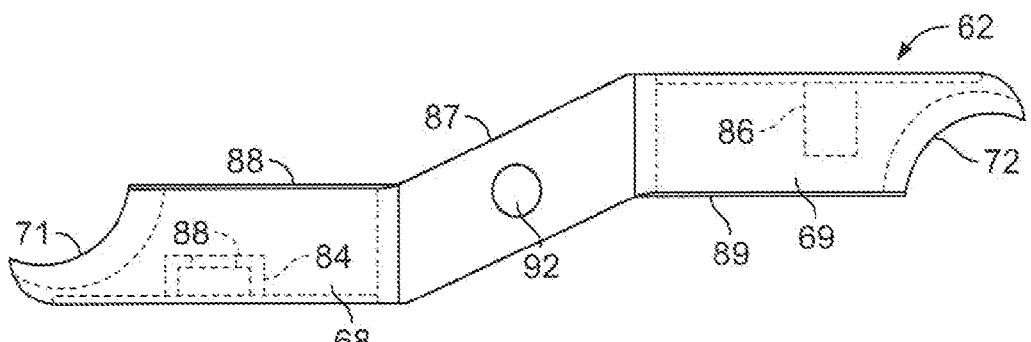
FIG. 9 is a side elevational view of a male clamping member of the second embodiment.
Figure 10:
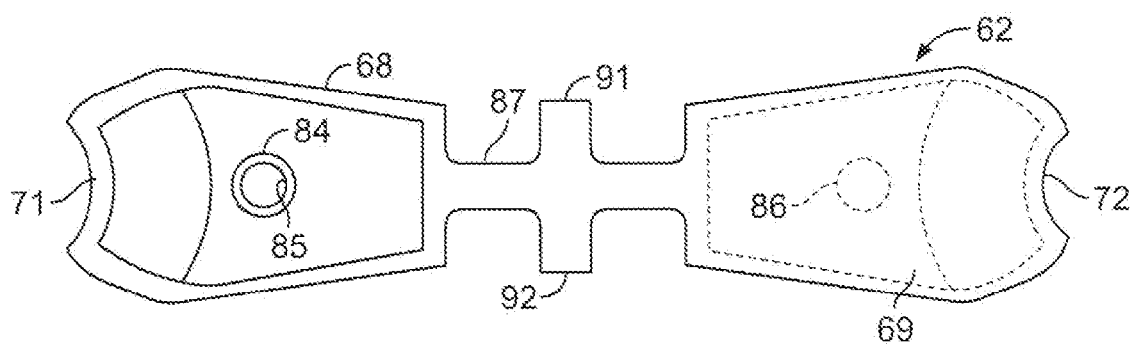
FIG. 10 is a top plan view of the male clamping member shown in FIG. 9.
Figure 11:
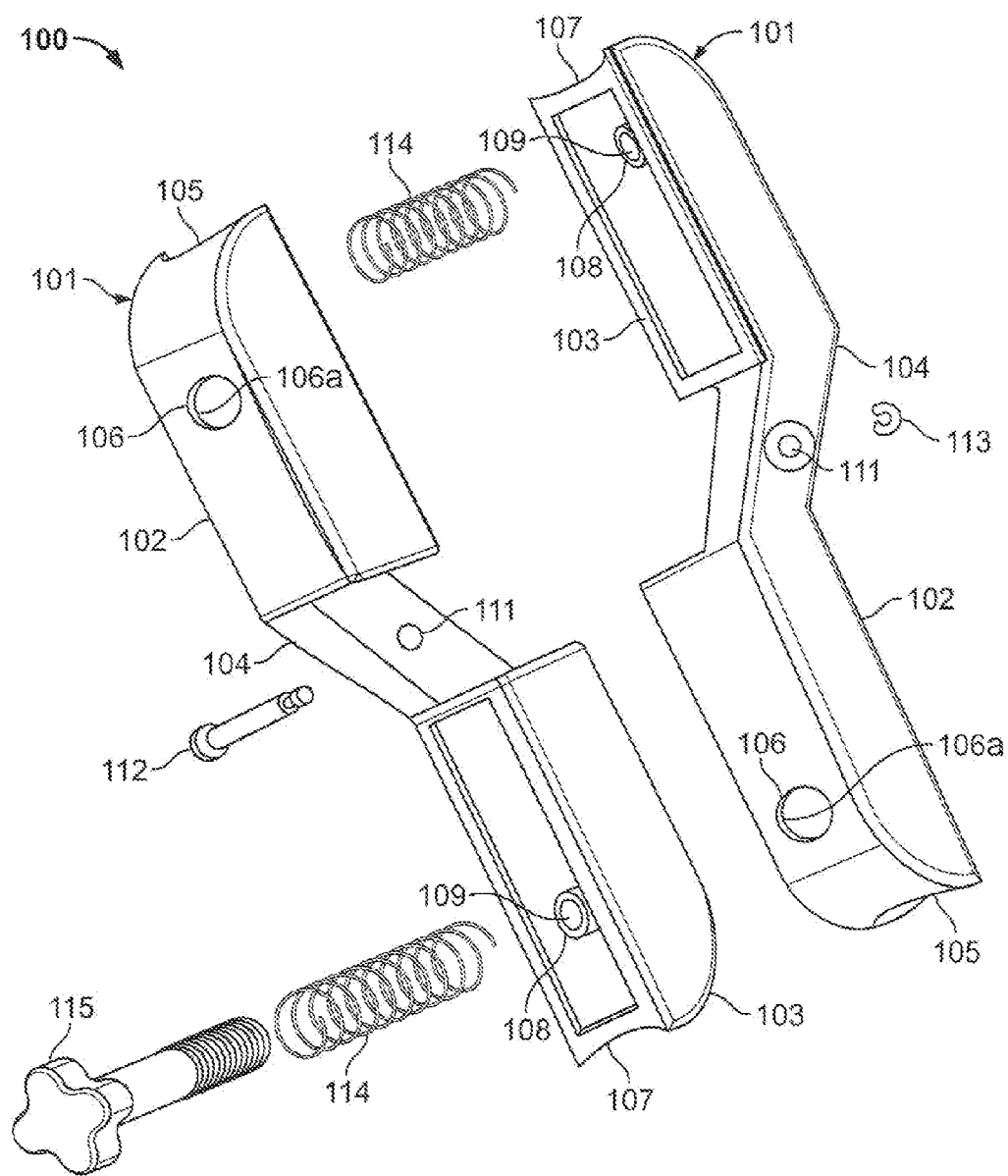
FIG. 11 is a perspective view of a third embodiment of the present invention utilizing two identical scissor halves.

Referring to FIGS. 9 and 10, a second scissor member 62 of the second embodiment is shown and described and includes similarly to the first scissor member, opposed clam shell outer walls 68 and 69 having semispherical recesses 71 and 72 positioned at the outer portions of each. As in the first scissor member 61, the opposed clam shell outer wall 68 and 69 are hollow. Within the interior of the first clam shell portion 68, a hollow, generally cylindrical wall 84 includes a threaded aperture 85 through the top thereof in which a second thumb screw 86 may be threadedly received (FIG. 4).

On the hollow inside of clam shell portion 69 of second scissor member 62 is positioned a post 86 similar to post 83 of the first scissor member and positioned so as to be aligned therewith in spatial relation when the first scissor member and second scissor member are assembled. The threaded aperture 85 is positioned so as to be aligned with aperture 82 in the first scissor member in spatial relation thereto when the first and second scissor member 61 and 62 are mounted together.

Unlike the first scissor member 61, the second scissor member 62 includes a single offset central web 87 that is offset in a direction opposite that of the offset web 75 of the first scissor embodiment such that the opposed edges 88 and 89 of clamshell portions 68 and 69 are on opposing sides of an axis centrally through the second scissor member 62 and through the offset portion 87. Along this axis is positioned a pair of cylindrical trunions 91 and 92 which extend perpendicular to the central axis running parallel to surfaces 88 and 89.

As with the first embodiment, trunions 91 and 92 are positioned so as to be fit into trunion mountings 76, 77, respectively when the first and second scissor member 61, 62 are brought together. As with the first embodiment, the assembly of the scissor members is performed by rotating one clam shell of the second scissor member 62 ninety degrees and inserting same through the opening between members 74, 75 of the first scissor member 61. After the clam shell is positioned therethrough, the member is reverse rotated 90 degrees and the trunions 91, 92 are positioned through trunion mounting recesses 78, 79 into their trunion mounting 76, 77.

Coil springs 93, 94 (FIG. 4) are positioned around the posts 83, 86 and around the thumbscrew 86, respectively to maintain the opposed clam shell halves in an outwardly biased position, absent the threading of thumbscrew 86 in the threaded aperture 85.

In operation, the ball type mountings 21, 21a shown in FIG. 1 may be inserted in the hollow interior of the clam shells so as to extend outwardly through the space between the semispherical recesses 65, 71 and 72, 66. Thereafter, the thumbscrew 86 is threaded into its threaded aperture, or tightened therein, until the ball type mountings are secured within the recesses.

The third embodiment 100 of the scissor clamp includes a pair of identical hollow cylindrical or clam shell shaped scissor member halves 101-101, with each having opposing hollow clam shell portions 102, 103 therein separated by a double offset web 104. Clam shell portion 102 includes a semispherical recess 105 adjacent the end thereof and an aperture 106 through an outer wall thereof.

Clam shell portion 103 includes a semicylindrical recess 107 adjacent the end thereof and a central hollow post 108 extending from the inner hollow surface thereof that includes a threaded aperture 109 centrally therein. The double offset central web 104 includes a central bore 111 therethrough. When a pair of the scissor members 101-101 are mounted together, the apertures 111-111 align so that a pivot pin 112 and a retaining clip 113 mounted adjacent the end of pivot pin 112 retain the two members in a pivotal scissors type mounting.

As in the previous embodiments, a pair of coil springs 114-114 are mounted between the hollow threaded posts 108 and the aperture 106 so as to allow a thumb screw 115 to be mounted through the aperture within the coil spring and be retained on the threaded interior 109 of the hollow cylindrical post 108. In this embodiment, the inner surface of the clam shell portion 102 includes a slight ridge around the edge of aperture 106 on the interior thereof identified as 106a that provides a mounting for one end of the coil spring 114.

Thus, a simplified version of the scissor clamp utilizing just a pair of a single, preferably molded scissor half members provides a less expensive means of utilizing a scissor clamp for variably mounting an external member, preferably a monitor, CRT, television or the like to an external surface.

While three differing embodiments of the present invention have been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed is:

1. A scissors-type clamp with opposed ball receiving heads, said clamp comprising:
   a pair of elongate complementary split arm members, each including opposing hollow semi-ball shape ends facing a common plane, and each split arm member including a pivotal mounting positioned substantially centrally between each of said semi-ball shaped ends,
   a pivotal mounting on one of said pair of split arm members being complementary to a pivotal mounting on the other of said split arm members,
   adjustable fastener means retained on each of said pair of elongate complementary split arm members offset to a common side of said pivotal mounting for selectively adjusting the distance between complementary ends adjacent one another,
   said opposing hollow semi-ball shape ends include substantially parallel internal sides and a central offset portion mediate said ends, one of said pivotal mountings being positioned on said central offset portion,
   said central offset portion includes a central first web positioned generally perpendicular to said common plane, and
   said one of said pivotal mountings includes a pair of co-axial pins extending from opposing sides of said web, said axis of said pin being in said common plane.

2. A scissors-type clamp with opposed ball receiving heads, said clamp comprising:
   a pair of elongate complementary split arm members, each including opposing hollow semi-ball shape ends facing a common plane, and each split arm member including a pivotal mounting positioned substantially centrally between each of said semi-ball shaped ends,
   a pivotal mounting on one of said pair of split arm members being complementary to a pivotal mounting on the other of said split arm members,
   adjustable fastener means retained on each of said pair of elongate complementary split arm members offset to a common side of said pivotal mounting for selectively adjusting the distance between complementary ends adjacent one another, and
   said opposing hollow semi-ball shape ends include substantially parallel internal sides and a central offset portion mediate said ends, one of said pivotal mountings being positioned on said central offset portion.

3. The scissor-type clamp as defined in claim 2 wherein, said central offset portion on one of said pair of split arm members includes a pair of substantially parallel spaced second webs extending between said opposing hollow semi-ball shape ends,
   an interior side of each of said second webs includes a recess complementary to said pivotal mounting on the other of said split arm members.

* * * * *